(12) United States Patent
Gross et al.

(10) Patent No.: US 7,733,602 B2
(45) Date of Patent: Jun. 8, 2010

(54) DISC MEDIUM SEPARATOR PLATE INCLUDING MULTIPLE AIRFLOW DIRECTING FEATURES

(75) Inventors: Hany Michael Gross, Eden Prairie, MN (US); Jackson Wagner Nichols, Belle Plaine, MN (US); Neal Frank Gunderson, Lake Elmo, MN (US)

(73) Assignee: Seagate Technology LLC, Scotts Valley, CA (US)

( * ) Notice: Subject to any disclaimer, the term of this patent is extended or adjusted under 35 U.S.C. 154(b) by 672 days.

(21) Appl. No.: 11/553,505

(22) Filed: Oct. 27, 2006

(65) Prior Publication Data

US 2008/0100957 A1    May 1, 2008

(51) Int. Cl.
*G11B 33/14* (2006.01)
(52) U.S. Cl. .................... 360/97.02; 360/97.03
(58) Field of Classification Search ......... 360/97.01, 360/97.02, 97.03, 98.01
See application file for complete search history.

(56) References Cited

U.S. PATENT DOCUMENTS

| | | | |
|---|---|---|---|
| 4,011,591 A * | 3/1977 | Orlando et al. | 360/98.03 |
| 4,879,618 A | 11/1989 | Iida et al. | |
| 5,189,574 A * | 2/1993 | Imamura et al. | 360/234.2 |
| 6,097,568 A | 8/2000 | Ekhoff | |
| 6,542,328 B2 | 4/2003 | Harrison et al. | |
| 6,710,977 B2 | 3/2004 | Tadepalli et al. | |
| 6,788,493 B1 * | 9/2004 | Subramaniam et al. | 360/97.02 |
| 6,891,696 B1 * | 5/2005 | Ou-Yang et al. | 360/97.02 |
| 6,930,857 B1 * | 8/2005 | Lin et al. | 360/97.02 |
| 7,133,238 B2 * | 11/2006 | Tadepalli et al. | 360/75 |
| 7,508,623 B2 * | 3/2009 | Gross | 360/97.02 |
| 2002/0036862 A1 | 3/2002 | Tsang et al. | |
| 2002/0135933 A1 | 9/2002 | Harrison et al. | |
| 2003/0179492 A1 * | 9/2003 | Kang et al. | 360/97.02 |
| 2005/0185327 A1 * | 8/2005 | Voights et al. | 360/97.03 |
| 2005/0219739 A1 | 10/2005 | Alt et al. | |
| 2005/0270691 A1 * | 12/2005 | Pottebaum et al. | 360/97.02 |

* cited by examiner

*Primary Examiner*—Jefferson Evans
(74) *Attorney, Agent, or Firm*—Leanne Taveggia Farrell; Westman, Champlin & Kelly, P.A.

(57) ABSTRACT

A media separator plate is provided having a plate main body and a shroud. The plate main body has a continuous, non-interrupted inner circumference and a continuous, non-interrupted outer circumference. The plate main body extends from the inner circumference to the outer circumference and includes a top surface and a bottom surface. The shroud is integrally formed with at least a portion of the outer circumference of the plate main body. The shroud is configured to at least partially surround the plate main body. The shroud extends above the top surface of the plate main body, below the bottom surface of the plate main body and outwardly from the outer circumference of the plate main body.

15 Claims, 6 Drawing Sheets

DISC MEDIUM SEPARATOR PLATE INCLUDING MULTIPLE AIRFLOW DIRECTING FEATURES

FIELD OF THE INVENTION

The present invention relates generally to a disc drive, and more particularly, but not by limitation, media separator plates in disc drives.

BACKGROUND OF THE INVENTION

A typical data storage system or disc drive includes a rigid housing that encloses a variety of components. The components can include a storage medium, usually in the form of one or more discs, having data surfaces for storage of digital information. In general, multiple discs mounted on a spindle motor are called a disc stack. The spindle motor causes the disc(s) to spin and the data surfaces of the disc(s) to pass under aerodynamic bearing disc head sliders. The sliders carry transducers, which write information to and read information from the data surfaces of the disc(s). The sliders are supported by suspension assemblies, which in turn are supported by track accessing arms of an actuator mechanism. A voice coil motor rotates the actuator mechanism to position sliders relative to desired data tracks on the disc(s).

Airflow caused by the rotation of the discs causes airflow-induced vibrations of the disc(s), suspensions and track accessing arms. Airflow-induced vibration is a major obstacle in achieving higher track densities for the disc(s). Currently, track densities have reached a point where the combined effects of several airflow control devices are necessary to achieve desirable performance. Various airflow control devices, including air dams, flow diverters and disc separator plates have been used in disc drives to mitigate aerodynamic excitation. In most cases, however, these airflow control devices can affect performance criteria, such as power, reliability and shock performance.

Non-repeatable run-out (NRRO) measurements have shown that vibration levels observed on outer sliders (i.e. sliders positioned below or above a disc stack) in a disc drive are generally lower than those observed on inner sliders (i.e. sliders positioned between discs in a disc stack). The airflow around an outer slider is driven by the shearing action of a single disc surface, and is bounded by a zero-velocity non-slip boundary condition at the surface of the drive enclosure (top cover or base) opposite an outer disc surface. The flow around an inner slider, on the other hand, is driven by the shearing action of two disc surfaces and generally develops higher velocities, which leads to higher levels of aerodynamic excitation than those experienced by the outer sliders. In addition, a typical outer track accessing arm on an actuator mechanism supports a single suspension, whereas an inner track accessing arm on the actuator mechanism supports two suspensions. The structural dynamic coupling between the inner arm and two suspensions and the aerodynamic coupling between the inner suspensions results in higher response levels to aerodynamic excitation than the structural dynamic coupling between the outer arm and single suspension. Since lower levels of aerodynamic excitation are desirable to achieve high track densities, it is desirable to design a disc stack where all sliders experience the structural and aerodynamic conditions of outer sliders.

Embodiments of the present invention provide solutions to these and other problems, and offer other advantages over the prior art.

SUMMARY OF THE INVENTION

A media separator plate is provided having a plate main body and a shroud. The plate main body has a continuous, non-interrupted inner circumference and a continuous, non-interrupted outer circumference. The plate main body extends from the inner circumference to the outer circumference and includes a top surface and a bottom surface. The shroud is integrally formed with at least a portion of the outer circumference of the plate main body. The shroud is configured to at least partially surround the plate main body. The shroud extends above the top surface of the plate main body, below the bottom surface of the plate main body and outwardly from the outer circumference of the plate main body.

A media separator plate is also provided that has a plate main body, a first portion included in the plate main body and a second portion included in the plate main body. The plate main body has a continuous, non-interrupted inner circumference and a continuous, non-interrupted outer circumference. The plate main body extends from the inner circumference to the outer circumference. The first portion is configured to allow an accessing arm to move across a storage medium adjacent to the media separator plate. The first portion has a top surface and a bottom surface. The second portion has a top surface and a bottom surface. The top surface of the second portion extends above the top surface of the first portion and the bottom surface of the second portion extends below the bottom surface of the first portion.

Other features and benefits that characterize embodiments of the present invention will be apparent upon reading the following detailed description and review of the associated drawings.

DETAILED DESCRIPTION OF ILLUSTRATIVE EMBODIMENTS

Figure 1:
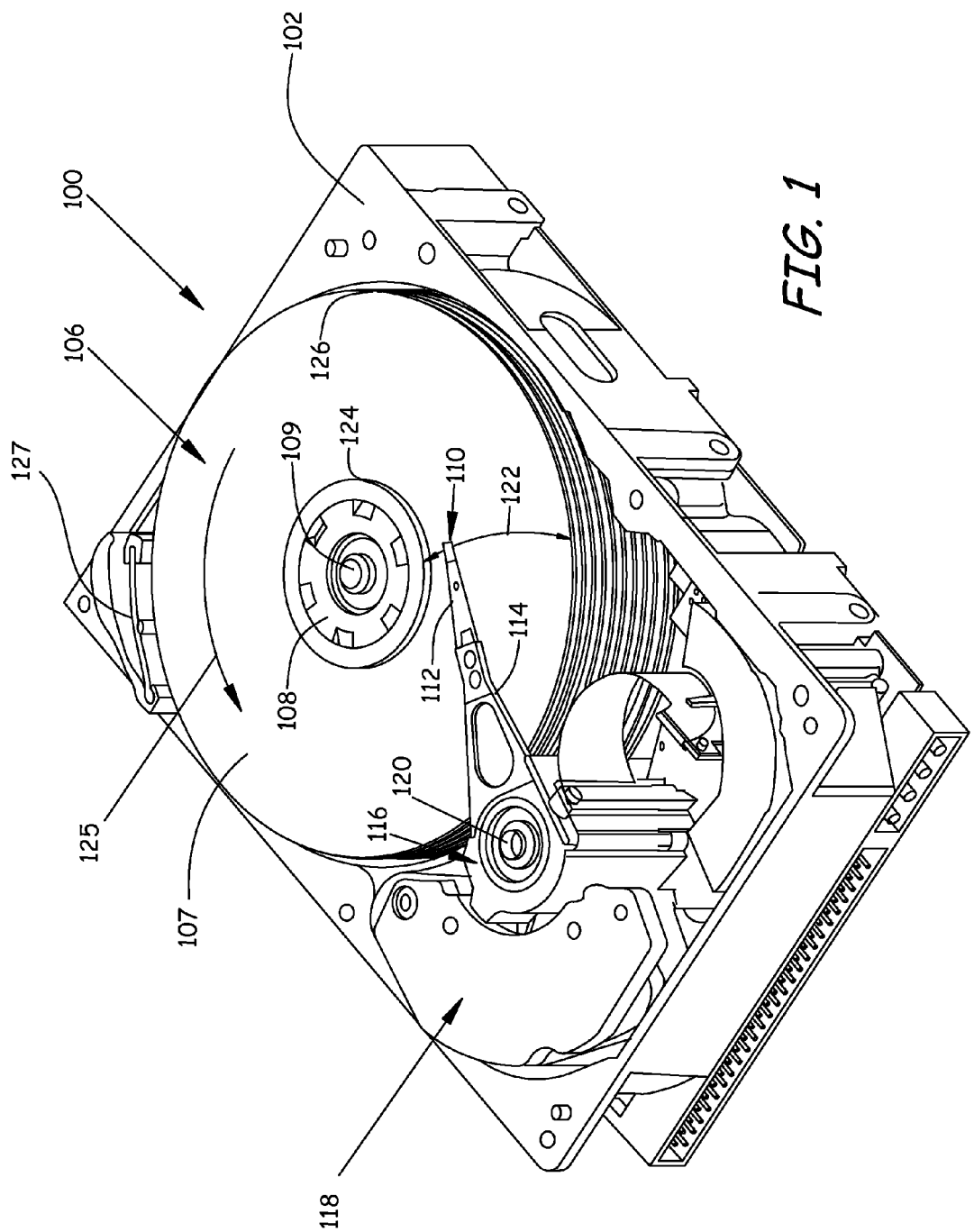
FIG. 1 illustrates perspective view of a disc drive.

FIG. 1 is a perspective view of a data storage system or disc drive 100 in which embodiments of the present invention are useful. Disc drive 100 includes a housing having a base 102 and a top cover (not shown). Disc drive 100 further includes a disc stack 106, which is mounted on a spindle motor (not shown), by a disc clamp 108. Disc stack 106 includes a plurality of individual discs 107, which are mounted for co-rotation about central axis 109. Disc stack 106 can include a plurality of discs, such as two discs or more. Although not illustrated in FIG. 1, disc drive 100 can also include a single disc that is mounted to a spindle motor by disc clamp 108. Regardless of the quantity of discs, each disc surface has an associated disc head slider 110, which is mounted to disc drive 100 for communication with the disc surface. In FIG. 1, sliders 110 are supported by suspensions 112, which are in turn attached to track accessing arms 114 of an actuator mechanism 116. The actuator mechanism shown in FIG. 1 is of the type known as a rotary moving coil actuator and includes a voice coil motor (VCM), shown generally at 118. Voice coil motor 118 rotates actuator mechanism about pivot shaft 120 to position sliders 110 over a desired data track along an arcuate path 122 between a disc inner diameter 124 and a disc outer diameter 126.

During operation, as discs 107 rotate in a direction 125, air is dragged under the hydrodynamic bearing of sliders 110 in a direction approximately parallel to the tangential velocity of discs 107. It should be noted that while direction 125 is a counter clockwise direction, discs 17 can also rotate in a clockwise direction. As the air passes beneath the bearing surfaces, air compression along the airflow path causes the air pressure between the disc surface and the bearing surfaces to increase, which creates a hydrodynamic lifting force that counteracts a load force provided by suspensions 112. This hydrodynamic lifting force causes the sliders 110 to "fly" above, and in close proximity, to the disc surface of each disc 107.

The rotation of disc 107 induces significant airflow within base 102 in the same general rotational direction 125. This airflow can contain harmful contaminants. Therefore, disc drive 100 includes recirculation filter 127 that removes contaminants from the airflow before the airflow is recirculated back to disc stack 106.

The airflow caused by rotating discs 107 can also cause airflow-induced vibrations on discs 107, suspensions 112 and track accessing arms 114. These airflow-induced vibrations are a major obstacle in achieving higher track densities. Currently, track densities have reached a point where the combined effects of several airflow controls devices are necessary to allow desirable performance. Vibration levels observed on outer sliders 110 (i.e. sliders 110 positioned below or above a disc stack 106) are generally lower than those observed on inner sliders 110 (i.e. sliders 110 positioned between discs 107 in disc stack 106). To design a disc stack where all sliders experience the structural and aerodynamic conditions of outer sliders, a 360 degree media separator plate can be placed between the discs 107.

Figure 2:
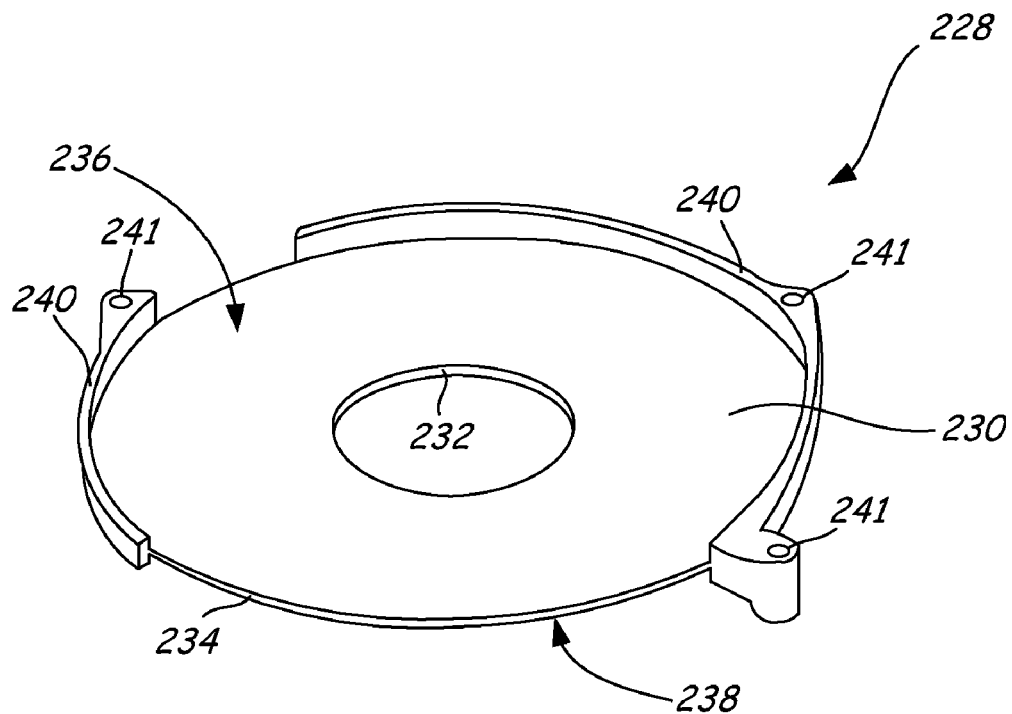
FIG. 2 illustrates a perspective view of a media separator plate in accordance with an embodiment of the present invention.

FIG. 2 illustrates a media separator plate 228 in accordance with an embodiment of the present invention. Media separator plate 228 is configured for use in a disc drive, such as disc drive 200 illustrated in FIG. 3. Media separator plate 228 includes a plate main body 230 having a continuous, non-interrupted inner circumference 232 and a continuous, non-interrupted outer circumference 234. Plate main body 230 extends from continuous inner circumference 232 to continuous outer circumference 234 to form a 360 degree plate. Plate main body 230 also includes a top surface 236 and a bottom surface 238.

Media separator plate 228 includes a shroud 240. In FIG. 2, media separator plate 228 includes two portions of shroud 240. It should be noted, however, that there can be any number of portions of shroud 240. Each portion of shroud 240 is configured to at least partially surround plate main body 230 along its outer circumference 234. In addition, there can be one single portion of shroud 240 that surrounds the entire plate main body 230. Each portion of shroud 240 is integrally formed with plate main body 230 at outer circumference 234. Each portion of shroud 240 extends above top surface 236 of plate main body 230, below bottom surface 238 and outwardly from outer circumference 234. Not only does each portion of shroud 240 control the airflow induced by rotating discs in the disc drive to reduce turbulence at the disc edge, each portion of shroud 240 may also provide screw holes 241 for fixedly mounting media separator plate 230 to the disc drive, such as disc drive 200 illustrated in FIG. 3.

Figure 3:
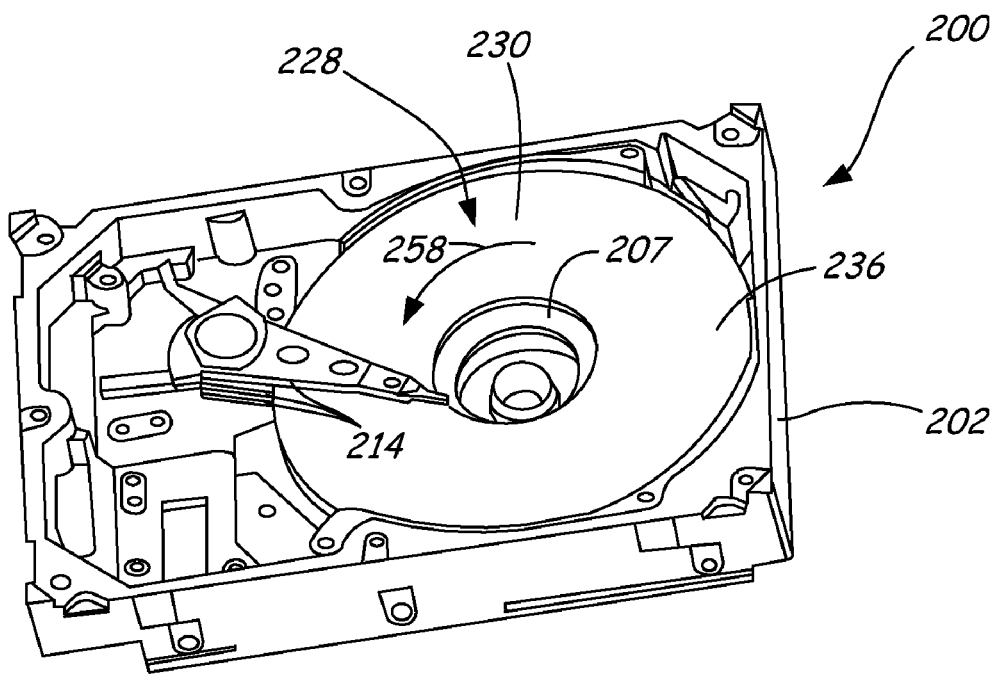
FIG. 3 illustrates a perspective view of a disc drive in an embodiment of the present invention including the media separator plate illustrated in FIG. 2.

FIG. 3 illustrates media separator plate 228 as positioned in a disc drive 200 in accordance with an embodiment of the present invention. In FIG. 3, base 202 of disc drive 200 is illustrated with the top cover removed. Disc drive 200 is configured to hold two discs 207 that are separated by media separator plate 228. The top disc and spindle motor are removed to better illustrate media separator plate 228 and the bottom disc 207. It should be noted that disc drive 200 is an exemplary illustration. Disc drive 200 can hold more discs and therefore more media separator plates between discs. Upon discs 207 rotating in a direction 258 in disc drive 200, an airflow is induced to flow in a generally similar direction.

As illustrated in FIG. 3, one of the track accessing arms 214 is movable between top surface 236 of plate main body 230 and the top disc and a second one of the track accessing arms 214 is movable between the bottom surface 238 (not illustrated in FIG. 3) of plate main body 230 and bottom disc 207. Although not completely illustrated in FIG. 3, a third one of the track accessing arms (removed to better illustrate media separator plate 228) is movable between the top cover of the disc drive and a top surface of the top disc and a fourth one of the track accessing arms 214 (partially hidden from view in FIG. 3) is movable between the base 202 of the disc drive and a bottom surface of bottom disc 207.

Figure 4:
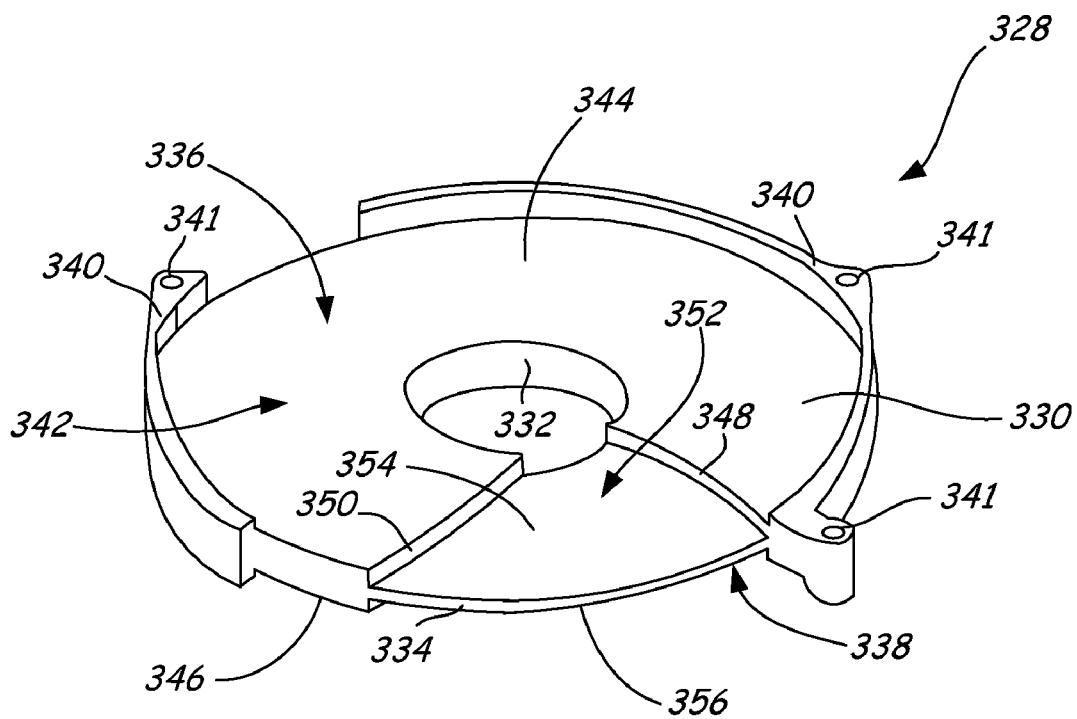
FIG. 4 illustrates a perspective view of a media separator plate in accordance with an embodiment of the present invention.

FIG. 4 illustrates a media separator plate 328 in accordance with an embodiment of the present invention. Media separator plate 328 is configured for use in a disc drive, such as disc drive 300 illustrated in FIG. 5. Media separator plate 328 includes a plate main body 330 having a continuous, non-interrupted inner circumference 332, a continuous, non-interrupted outer circumference 334, a top surface 336 and a bottom surface 338. Plate main body 330 extends from continuous inner circumference 332 to continuous outer circumference 334 to form a 360 degree plate.

Media separator plate 328 includes a shroud 340. In FIG. 4, media separator plate 328 includes two portions of shroud 340. It should be noted, however, that there can be any number of portions of shroud 340. Each portion of shroud 340 is configured to at least partially surround plate main body 330 along its outer circumference 334. In addition, there can be one single portion of shroud 340 that surrounds the entire plate main body 330. Each portion of shroud 340 is integrally formed with plate main body 330 at outer circumference 334. Each portion of shroud 340 extends above top surface 336 of plate main body 330, below bottom surface 338 and outwardly from outer circumference 334. Not only does each portion of shroud 340 control the airflow induced by rotating discs in the disc drive to reduce turbulence, each portion of shroud 340 may also provide screw holes 341 for fixedly mounting media separator plate 330 to the disc drive.

Plate main body 330 includes a partial plate feature 342. Partial plate feature 342 includes a top surface 344, bottom surface 346, a leading edge 348 and a trailing edge 350. Partial plate feature 342 extends from continuous outer circumference 334 to continuous inner circumference 332 and from leading edge 348 to trailing edge 350. Between leading edge 348 and trailing edge 350, partial plate feature 342 defines an arm sweep section 352 of media separation plate 328. Arm sweep section 352 is configured to accommodate movement of track accessing arms in a disc drive. Arm sweep section 352 includes a top surface 354 and a bottom surface 356. Therefore, top surface 336 of media separator plate 328 includes top surface 344 of partial plate feature 342 and top surface 354 of arm sweep section 352. Accordingly, bottom surface 338 of media separator plate 328 includes bottom surface 346 of partial plate feature 342 and bottom surface 356 of arm sweep section 352.

A partial plate feature thickness between top surface 344 and bottom surface 346 of partial plate feature 342 is greater than an arm sweep section thickness between top surface 354 and bottom surface 356 of arm sweep section 352. In addition, top surface 344 of partial plate feature 342 extends above top surface 354 of arm sweep section 352 and bottom surface 346 of partial plate feature 342 extends below bottom surface 356 of arm sweep section 352. Partial plate feature 342 provides media separator plate 328 with a partially thicker plate main body 330 than plate main body 230 illustrated in FIG. 2. A partially thicker plate main body 330 better defines airflow induced by rotating discs in the disc drive than that of the FIG. 2 media separator plate 228. Media separator plate 328 provides less room in between the discs in the disc drive and therefore results in a reduction in airflow velocity and consequently a reduction of disc vibration. Partial plate feature 342 of media separator plate 328 also provides maximum shielding of the track accessing arms, which causes a reduction in the momentum impinging on the track accessing arms and consequently a reduction in track accessing arm and suspension vibration. However, media separator plate 328 is less able to direct airflow induced by rotating discs to a recirculation filter for cleaning than media separator plate 228. In addition, it is expected that media separator plate 328 results in a higher power consumption in the disc drive compared to media separator plate 228. This increase in power consumption occurs because media separator plate 328 results in an increase in shear stresses due to the reduced spacing between the discs and the plate.

Figure 5:
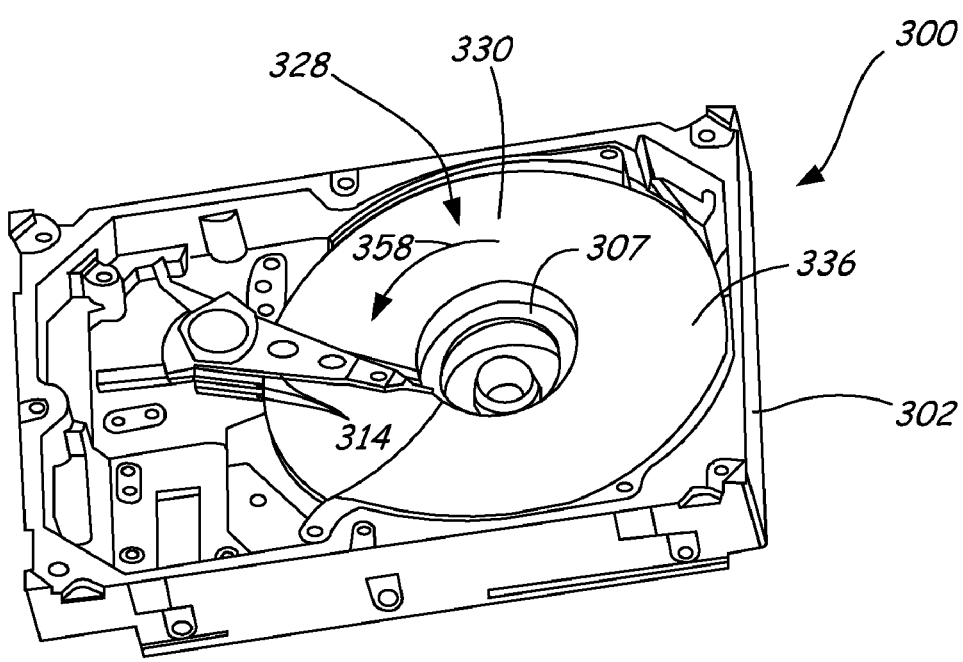
FIG. 5 illustrates a perspective view of a disc drive in an embodiment of the present invention including the media separator plate illustrated in FIG. 4.

FIG. 5 illustrates media separator plate 328 as positioned in a disc drive 300 in accordance with an embodiment of the present invention. In FIG. 5, base 302 of disc drive 300 is illustrated with the top cover removed. Disc drive 300 is configured to hold two discs 307 that are separated by media separator plate 328. The top disc and spindle motor are removed to better illustrate media separator plate 328 and the bottom disc 307. It should be noted that disc drive 300 is an exemplary illustration. Disc drive 300 can hold more discs and therefore more media separator plates between discs. Upon discs 307 rotating in a direction 358, the airflow in disc drive 300 is induced to flow in a similar direction.

As illustrated in FIG. 5, one of the track accessing arms 314 is movable between top surface 336 of plate main body 330 and the top disc and a second one of the track accessing arms 314 is movable between the bottom surface 338 (not illustrated in FIG. 5) of plate main body 330 and bottom disc 307. Although not completely illustrated in FIG. 5, a third one of the track accessing arms (removed to better illustrate media separator plate 328) is movable between the top cover of the disc drive and a top surface of the top disc and a fourth one of the track accessing arms 314 (partially hidden from view in FIG. 5) is movable between the base 302 of the disc drive and a bottom surface of bottom disc 307.

Figure 6:
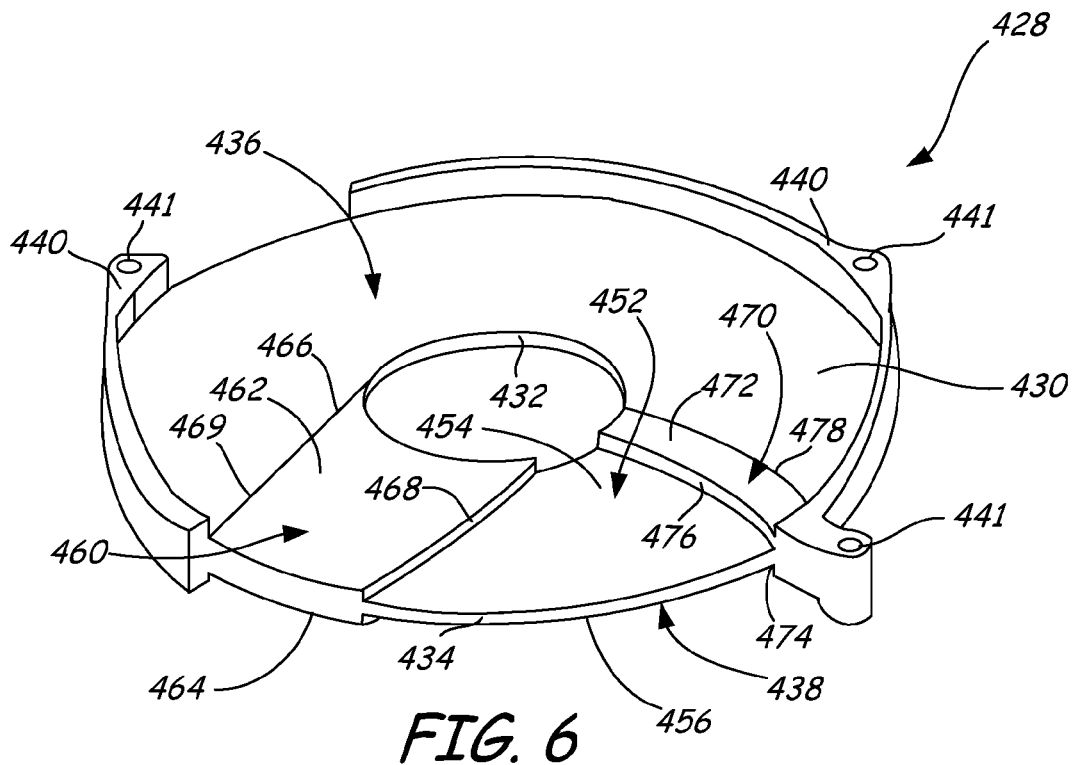
FIG. 6 illustrates a perspective view of a media separator plate in accordance with an embodiment of the present invention.

FIG. 6 illustrates a media separator plate 428 in accordance with an embodiment of the present invention. Media separator plate 428 is configured for use in a disc drive, such as disc drive 400 illustrated in FIG. 7. Media separator plate 428 includes a plate main body 430 having a continuous, non-interrupted inner circumference 432, a continuous, non-interrupted outer circumference 434, a top surface 436 and a bottom surface 438. Plate main body 430 extends from continuous inner circumference 432 to continuous outer circumference 434 to form a 360 degree plate.

Media separator plate 428 includes a shroud 440. In FIG. 6, media separator plate 428 includes two portions of shroud 440. It should be noted, however, that there can be any number of portions of shroud 440. Each portion of shroud 440 is configured to at least partially surround plate main body 430 along its outer circumference 434. In addition, there can be one single portion of shroud 440 that surrounds the entire plate main body 430. Each portion of shroud 440 is integrally formed with plate main body 430 at outer circumference 434. Each portion of shroud 440 extends above top surface 436 of plate main body 430, below bottom surface 438 and outwardly from outer circumference 434. Not only does each portion of shroud 440 control the airflow induced by rotating discs in the disc drive to reduce turbulence, each portion of shroud 440 may also provide screw holes 441 for fixedly mounting media separator plate 430 to the disc drive.

Plate main body 430 includes an upstream air dam feature 460. Upstream air dam feature 460 includes a top surface 462, bottom surface 464, a leading edge 466 and a trailing edge 468. Upstream air dam feature 460 extends from continuous outer circumference 434 to continuous inner circumference 432 and from leading edge 466 to trailing edge 468. Leading edge 466 of upstream air dam feature 460 includes an upstream diverter feature 469. The upstream diverter feature 469 diverts airflow induced by rotating discs adjacent to plate main body 430 towards a region outside of media separator plate 428 and therefore outside the disc stack in the disc drive.

Plate main body 430 includes a downstream air dam feature 470. Downstream air dam feature 470 includes a top surface 472, bottom surface 474, a leading edge 476 and a trailing edge 478. Downstream air dam feature 470 extends from continuous outer circumference 434 to continuous inner circumference 432 and from leading edge 476 to trailing edge 478. Between trailing edge 468 of upstream air dam feature 460 and leading edge 476 of downstream air dam feature 470 is defined an arm sweep section 452 of media separation plate 428. Arm sweep section 452 is configured to accommodate movement of track accessing arms in the disc drive. Arm sweep section 452 includes a top surface 454 and a bottom surface 456. Therefore, top surface 436 of media separator plate 428 includes at least top surface 462 of upstream air dam feature 460, top surface 472 of downstream air dam feature 470 and top surface 454 of arm sweep section 452. Accordingly, bottom surface 438 of media separator plate 428 includes at least bottom surface 464 of upstream air dam feature 460, bottom surface 474 of downstream air dam feature 470 and bottom surface 456 of arm sweep section 452.

An upstream air dam feature thickness between top surface 462 and bottom surface 464 of upstream air dam feature 460 is greater than an arm sweep section thickness between top surface 454 and bottom surface 456 of arm sweep section 452.

A downstream air dam feature thickness between top surface 472 and bottom surface 474 of downstream air dam feature 470 is also greater than the arm sweep section thickness. In addition, top surface 462 of upstream air dam feature 460 extends above top surface 454 of arm sweep section 452 and bottom surface 464 of upstream air dam feature 460 extends below bottom surface 456 of arm sweep section 452. Top surface 472 of downstream air dam feature 470 extends above top surface 454 of arm sweep section 452 and bottom surface 474 of downstream air dam feature 470 extends below bottom surface 456 of arm sweep section 452. Upstream air dam feature 460 and downstream air dam feature 470 provide media separator plate 428 with a partially thicker plate main body 430 than plate main body 230 illustrated in FIG. 2 (the thickness of upstream air dam feature 460 and downstream air dam feature 470 are substantially similar to that of plate main body in FIG. 4). A partially thicker plate main body 430 better defines airflow than that of the FIG. 2 media separator plate 228 and provides shielding of the track accessing arms which causes a reduction in the momentum impinging on the track accessing arms and consequently a reduction in track accessing arm and suspension vibration. Plate main body 430 also partially remedies the increase in power consumption in the disc drive created by media separator plate 428 and allows more airflow induced by rotating discs to a recirculation filter 427 (FIG. 7) for cleaning than media separator plate 328 (FIG. 4).

Figure 7:
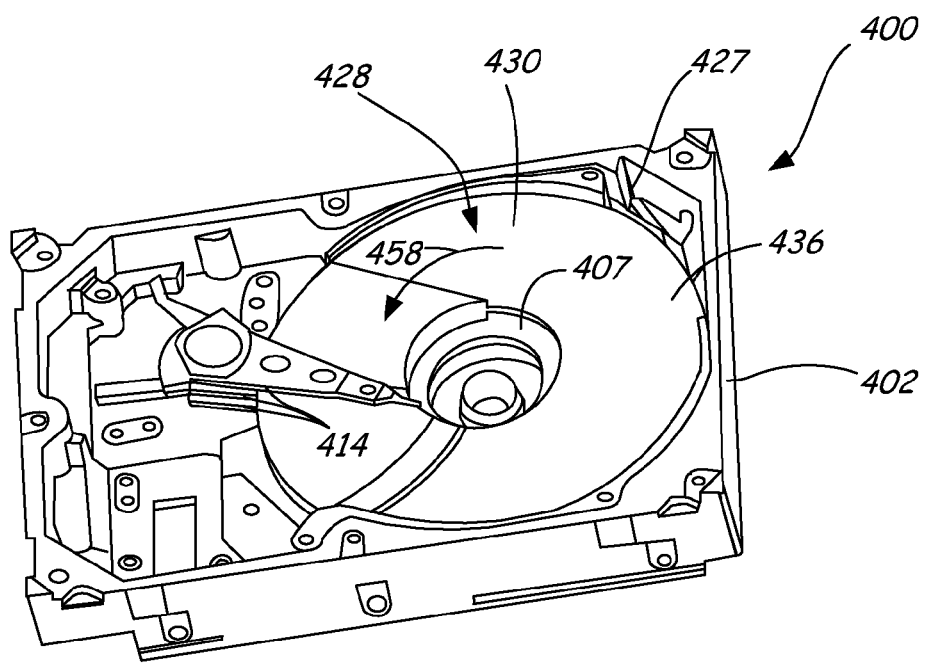
FIG. 7 illustrates a perspective view of a disc drive in an embodiment of the present invention including the media separator plate illustrated in FIG. 6.

FIG. 7 illustrates media separator plate 428 as positioned in a disc drive 400 in accordance with an embodiment of the present invention. In FIG. 7, base 402 of disc drive 400 is illustrated with the top cover removed. Disc drive 400 is configured to hold two discs 407 that are separated by media separator plate 428. The top disc and spindle motor are removed to better illustrate media separator plate 428 and the bottom disc 407. It should be noted that disc drive 400 is an exemplary illustration. Disc drive 400 can hold more discs rotating in a direction 458 and therefore more media separator plates between discs. Upon discs 407 rotating in disc drive 400 in direction 458, airflow is induced flow in a similar direction.

As illustrated in FIG. 7, one of the track accessing arms 414 is movable between top surface 436 of plate main body 430 and the top disc and a second one of the track accessing arms 414 is movable between the bottom surface 438 (not illustrated in FIG. 7) of plate main body 430 and bottom disc 407. Although not completely illustrated in FIG. 7, a third one of the track accessing arms (removed to better illustrate media separator plate 428) is movable between the top cover of the disc drive and a top surface of the top disc and a fourth one of the track accessing arms 414 (partially hidden from view in FIG. 7) is movable between the base 402 of the disc drive and a bottom surface of bottom disc 407.

Figure 8:
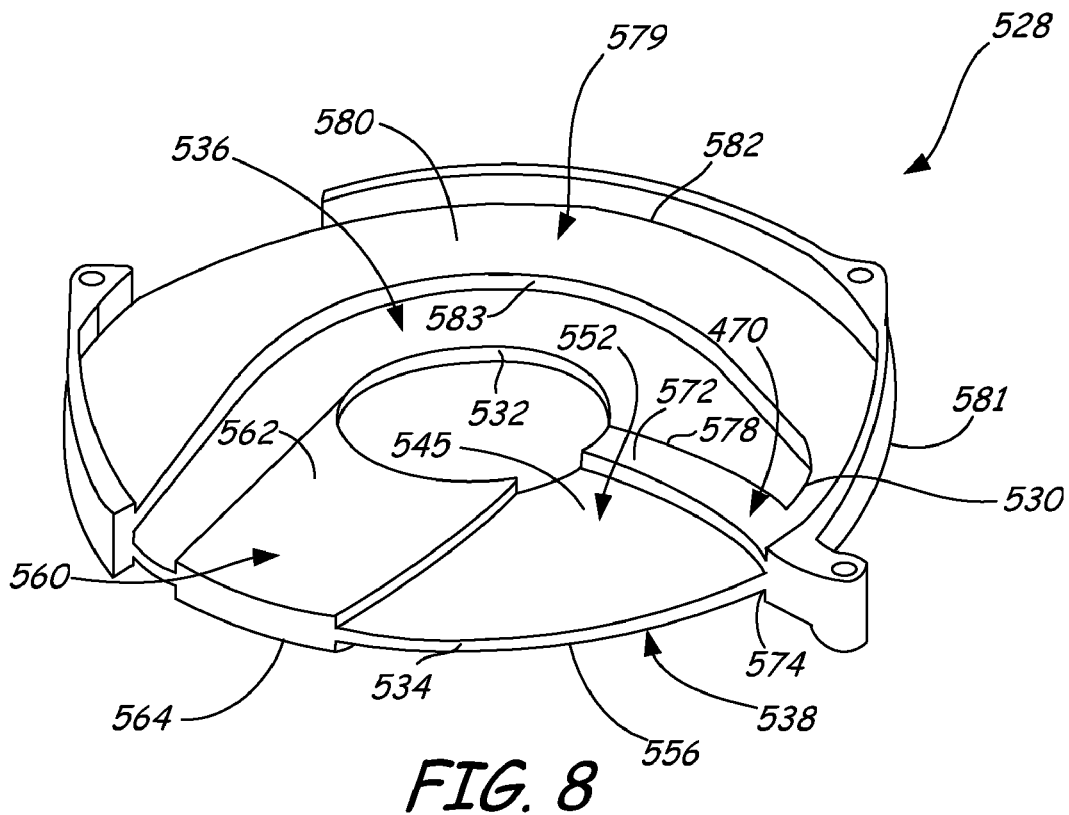
FIG. 8 illustrates a perspective view of a media separator plate in accordance with an embodiment of the present invention.

FIG. 8 illustrates a media separator plate 528, which is substantially similar to media separator plate 428 of FIG. 6, except, media separator plate 528 includes a first partial plate feature 579 in accordance with an embodiment of the present invention. Media separator plate 528 is configured for use in a disc drive, such as disc drive 500 illustrated in FIG. 9. Media separator plate 528 includes a plate main body 530 having a continuous, non-interrupted outer circumference 534, a continuous, non-interrupted inner circumference 532, a top surface 536 and a bottom surface 538. First partial plate feature 579 is coupled to a portion of trailing edge 578 of downstream air dam feature 570. First partial plate feature includes a top surface 580, a bottom surface 581, an outer circumference edge 582 and an inner circumference edge 583. Outer circumference edge 582 is adjacent with outer circumference 534 of plate main body 530. Inner circumference edge 583 is spaced apart from inner circumference 532 of plate main body 530. First partial plate feature 579 extends about outer circumference 534 of plate main body 530 from the outer circumference of the plate main body towards inner circumference 534 of the plate main body. Therefore, top surface 536 of media separator plate 528 includes at least top surface 562 of upstream air dam feature 560, top surface 572 of downstream air dam feature 570, top surface 580 of first partial plate feature 579 and top surface 554 of arm sweep section 552. Accordingly, bottom surface 538 of media separator plate 528 includes at least bottom surface 564 of upstream air dam feature 560, bottom surface 574 of downstream air dam feature 570, bottom surface 581 of first partial plate feature 579 and bottom surface 556 of arm sweep section 552.

A first partial plate feature thickness between top surface 580 and bottom surface 581 of partial plate feature 579 is greater than the arm sweep section thickness between top surface 454 and bottom surface 556 of arm sweep section 552. In addition, top surface 580 of first partial plate feature 579 extends above top surface 554 of arm sweep section 552 and bottom surface 581 of partial plate feature 579 extends below bottom surface 556 of arm sweep section 552.

Upstream air dam feature 560, downstream air dam feature 570 and first partial plate feature 579 provide media separator plate 528 with a partially thicker plate main body 530 than plate main body 230 illustrate in FIG. 2 and plate main body 430 illustrated in FIG. 6. However, upstream air dam feature 560, downstream air dam feature 570 and first partial plate feature 579 provide a partially thinner plate main body 530 than plate main body 330 in FIG. 4. A partially thicker plate main body 530 better defines airflow than that of media separator plate 228 and media separator plate 428 and provides shielding of the track accessing arms which causes a reduction in the momentum impinging on the track accessing arms and consequently a reduction in track accessing arm and suspension vibration. Plate main body 530 also partially remedies the decrease in power performance in the disc drive created by media separator plate 328 of FIG. 4. However, media separator plate 528 is less able to direct airflow to a recirculation filter for cleaning of the airflow than media separator plate 228 and media separator plate 428.

Figure 9:
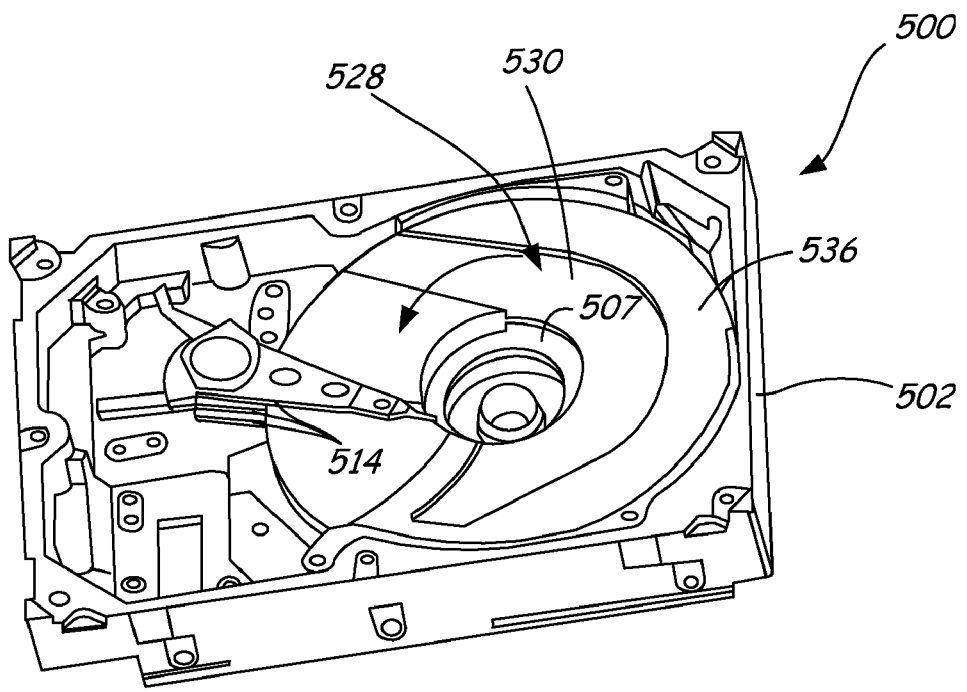
FIG. 9 illustrates a perspective view of a disc drive in an embodiment of the present invention including the media separator plate illustrated in FIG. 8.

FIG. 9 illustrates media separator plate 528 positioned in disc drive 500 in accordance with an embodiment of the present invention. As illustrated in FIG. 9, one of the track accessing arms 514 is movable between top surface 536 of plate main body 530 and the top disc and a second one of the track accessing arms 514 is movable between the bottom surface 538 of plate main body 530 and bottom disc 507. Although not completely illustrated in FIG. 9, a third one of the track accessing arms (removed to better illustrate media separator plate 528) is movable between the top cover of the disc drive and a top surface of the top disc and a fourth one of the track accessing arms 514 (partially hidden from view in FIG. 9) is movable between the base 502 of the disc drive and a bottom surface of bottom disc 507.

Figure 10:
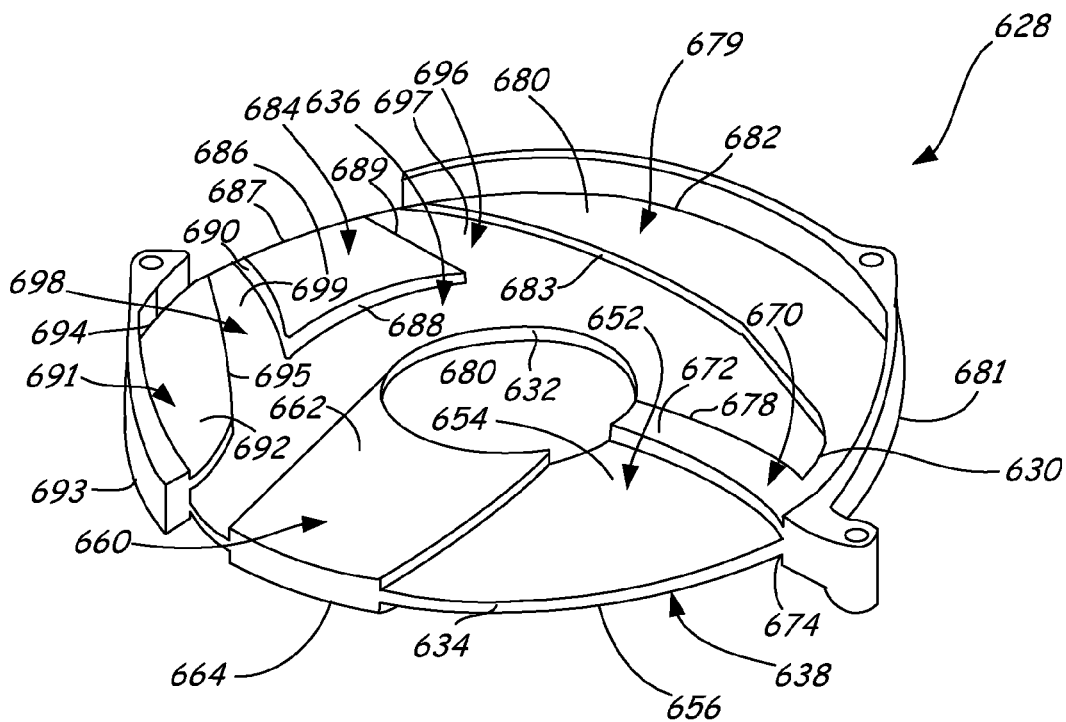
FIG. 10 illustrates a perspective view of a media separator plate in accordance with an embodiment of the present invention.

FIG. 10 illustrates a media separator plate 628, which is similar to media separator plate 428 of FIG. 6, except, media separator plate 628 includes a first partial plate feature 679, second partial plate feature 684 and third partial plate feature 691 in accordance with an embodiment of the present invention. Media separator plate 628 is configured for use in a disc drive, such as disc drive 600 illustrated in FIG. 11. Media separator plate 628 includes a plate main body 630 having a continuous, non-interrupted outer circumference 634, a continuous, non-interrupted inner circumference 632, a top surface 636 and a bottom surface 638. First partial plate feature 679 is coupled to a portion of trailing edge 678 of downstream air dam feature 670. First partial plate feature 679 includes a top surface 680, a bottom surface 681, an outer circumference edge 682 and an inner circumference edge 683. Outer circumference edge 682 is adjacent to outer circumference 634 of plate main body 630. Inner circumference edge 683 is spaced apart from inner circumference 632 of plate main body 630. First partial plate feature 679 extends about outer circumference 634 of plate main body 630 from the outer circumference of the plate main body towards inner circumference 634 of the plate main body.

Second partial plate feature 684 includes a top surface 686, a bottom surface (hidden from view), an outer circumference edge 687, an inner circumference edge 688, a leading edge 689 and a trailing edge 690. Outer circumference edge 687 is adjacent to outer circumference 634 of plate main body 630. Inner circumference edge 688 is spaced apart from inner circumference 632 of plate main body 630. Second partial plate feature 684 extends about outer circumference 634 of plate main body 630 from the outer circumference of the plate main body towards inner circumference 634 of the plate main body and from leading edge 689 to trailing edge 690.

Third partial plate feature 691 includes a top surface 692, a bottom surface 693, an outer circumference edge 694 and an inner circumference edge 695. Outer circumference edge 694 is adjacent to outer circumference 634 of plate main body 630. Inner circumference edge 695 is spaced apart from inner circumference 632 of plate main body 630. Third partial plate feature 691 extends about outer circumference 434 of plate main body 630 from the outer circumference of the plate main body towards inner circumference 634 of the plate main body.

Leading edge 689 of second partial plate feature 684 is spaced apart from inner circumference edge 683 of first partial plate feature 684 to define an inlet airflow channel 696. Inlet airflow channel has a top surface 697 and a bottom surface (hidden from view). Inlet airflow channel is configured to supply airflow induced by rotating discs in the disc drive to a recirculation filter. Trailing edge 690 of second partial plate feature 684 is spaced apart from inner circumference edge 695 of third partial plate feature 691 to define an outlet airflow channel 698. Outlet airflow channel has a top surface 699 and a bottom surface (hidden from view). Outlet airflow channel 698 is configured to direct airflow induced by rotating discs in the disc drive away from the recirculation filter and eventually to a region outside of media separation plate 628 and the corresponding disc stack. Therefore, top surface 636 of media separator plate 628 at least includes top surface 680 of first partial plate feature 679, top surface 686 of second partial plate feature 684, top surface 692 of third partial plate feature 691, top surface 462 of upstream air dam feature 660, top surface 672 of downstream air dam feature 670 and top surface 654 of arm sweep section 652. Accordingly, bottom surface 438 at least includes bottom surface 681 of first partial plate feature 679, the bottom surface of second partial plate feature 684, bottom surface 693 of third partial plate feature 691, bottom surface 664 of upstream air dam feature 660, bottom surface 674 of downstream air dam feature 670 and bottom surface 656 of arm sweep section 652.

A first partial plate feature thickness between top surface 680 and bottom surface 681 of first partial plate feature 679 is greater than an inlet channel thickness between top surface 697 and the bottom surface of inlet channel 696. A second partial plate feature thickness between top surface 686 and the bottom surface of second partial plate feature 684 is greater than the inlet channel thickness. The second partial plate feature thickness is also greater than an outlet channel thickness between top surface 699 and the bottom surface of outlet channel 698. A third partial plate feature thickness between top surface 692 and bottom surface 693 of third partial plate feature 691 is greater than the outlet channel thickness. In addition, top surfaces 680 and 686 of first partial plate feature 679 and second partial plate feature 680 extend above top surface 697 of inlet channel 696. Bottom surface 681 of first partial plate feature and the bottom surface of second partial plate feature 684 extend below the bottom surface of inlet channel 696. Top surface 686 of second partial plate feature 684 and top surface 692 of third partial plate feature 691 extend above top surface 699 of outlet channel 698. The bottom surface of second partial plate feature 680 and bottom surface 693 of third partial plate feature 691 extend below the bottom surface of outlet channel 698.

Upstream air dam feature 460, downstream air dam feature 670, first partial plate feature 679, second partial plate feature 684 and third partial plate feature 691 provide media separator plate 628 with a partially thicker plate main body 630 than plate main body 230 illustrate in FIG. 2 and plate main body 430 in FIG. 6 (the thickness of upstream air dam feature 660, downstream air dam feature 670, first partial plate feature 679, second partial plate feature 684 and third partial plate feature 691 are the same as that of the plate main body in FIGS. 4 and 8). A partially thicker plate main body 630 better defines airflow than that of media separator plate 228 and media separator plate 428 and provides shielding of the track accessing arms which causes a reduction in the momentum impinging on the track accessing arms and consequently a reduction in track accessing arm and suspension vibration. Plate main body 630 also partially remedies the decrease in power performance in the disc drive created by media separator plate 328 of FIG. 4. Also, the FIG. 10 media separator plate 628 is able to effectively direct airflow induced by rotating discs through inlet channel 696 and outlet channel 698 to a recirculation filter for cleaning. This effective airflow direction is better than that in media separator plate 328 of FIG. 4 and media separator plate 528 in FIG. 8.

Figure 11:
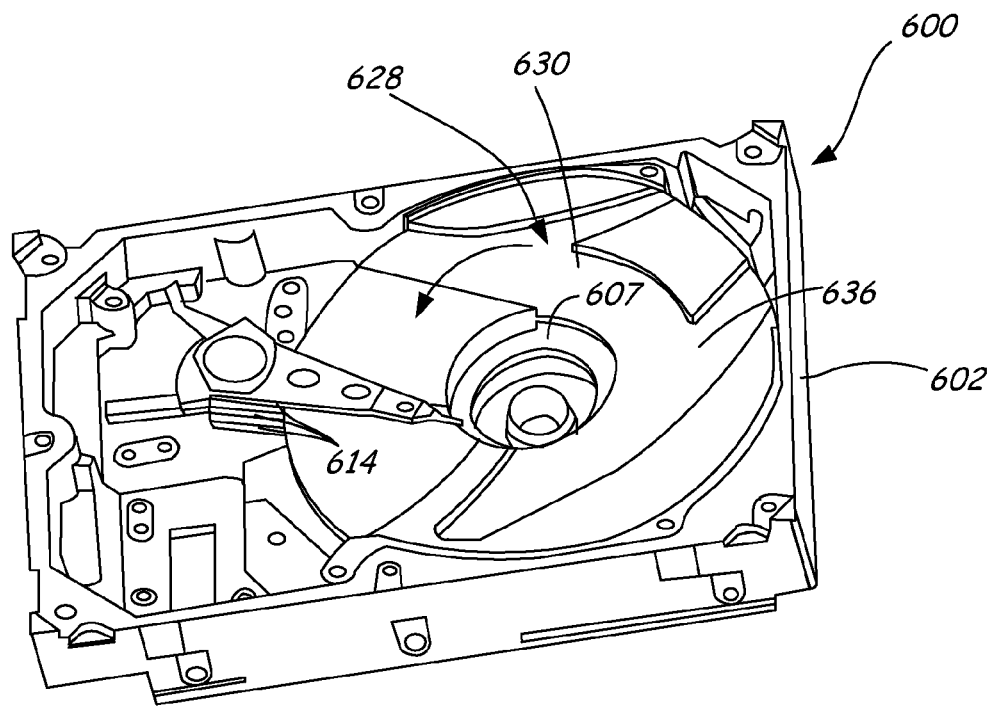
FIG. 11 illustrates a perspective view of a disc drive in an embodiment of the present invention including the media separator plate illustrated in FIG. 10.

FIG. 11 illustrates media separator plate 628 positioned in disc drive 600 in accordance with an embodiment of the present invention. As illustrated in FIG. 11, one of the track accessing arms 614 is movable between top surface 636 of plate main body 630 and the top disc and a second one of the track accessing arms 614 is movable between the bottom surface 638 of plate main body 630 and bottom disc 607. Although not completely illustrated in FIG. 11, a third one of the track accessing arms (removed to better illustrate media separator plate 628) is movable between the top cover of the disc drive and a top surface of the top disc and a fourth one of the track accessing arms 614 (partially hidden from view in FIG. 11) is movable between the base 602 of the disc drive and a bottom surface of bottom disc 607.

It is to be understood that even though numerous characteristics and advantages of various embodiments of the invention have been set forth in the foregoing description, together with details of the structure and function of various embodiments of the invention, this disclosure is illustrative only, and changes may be made in detail, especially in matters of structure and arrangement of parts within the principles of the present invention to the full extent indicated by the broad general meaning of the terms in which the appended claims are expressed. For example, the particular elements may vary depending on the particular application for the media separator plate while maintaining substantially the same functionality without departing from the scope and spirit of the present invention. In addition, although the preferred embodiment described herein is directed to a media separation plate for a data storage system, it will be appreciated by those skilled in the art that the teachings of the present invention can be applied to other types of electronic devices, without departing from the scope and spirit of the present invention.

What is claimed is:

1. A media separator plate comprising:
a plate main body having a continuous, non-interrupted inner circumference and a continuous, non-interrupted outer circumference, wherein the plate main body extends from the inner circumference to the outer circumference;
a shroud integrally formed with at least a portion of the outer circumference of the plate main body and configured to at least partially surround the plate main body, the shroud extends above the top surface of the plate main body, below the bottom surface of the plate main body and outwardly from the outer circumference of the plate main body;
a first partial plate feature formed with the plate main body and extending from the inner circumference to the outer circumference, the first partial plate feature having a top surface, a bottom surface, a leading edge and a trailing edge, wherein between the leading edge and the trailing edge is defined an arm sweep section having a top surface and a bottom surface; and
wherein the top surface of the first partial plate feature extends above the top surface of the arm sweep section and wherein the bottom surface of the first partial plate feature extends below the bottom surface of the arm sweep section.

2. The media separator plate of claim 1, wherein between the top surface and the bottom surface of the first partial plate feature comprises a first partial plate thickness that is greater than an arm sweep section thickness between the top surface and bottom surface of the arm sweep section.

3. The media separator plate of claim 1, further comprising a second partial plate feature formed with the plate main body and having a top surface, a bottom surface, a leading edge and a trailing edge, and wherein the leading edge of the first partial plate feature is spaced apart from the trailing edge of the second partial plate feature along the plate main body, and wherein between the trailing edge of the first partial plate feature and the leading edge of the second partial plate feature is defined the arm sweep section.

4. The media separator plate of claim 3, wherein the leading edge of the first partial plate feature comprises an upstream diverter feature for diverting the airflow adjacent the plate main body towards a region outside of the media separator plate.

5. The media separator plate of claim 3, wherein between the top surface and the bottom surface of the second partial plate feature comprises a second partial plate thickness that is greater than a thickness between the top surface and the bottom surface of the arm sweep section.

6. The media separator plate of claim 3, further comprising a third partial plate feature formed with the plate main body and coupled to a portion of the trailing edge of the second partial plate feature and having a top surface, a bottom surface, an outer circumference edge and an inner circumference edge, wherein the outer circumference edge is adjacent the outer circumference of the plate main body and the inner circumference edge is spaced apart from the inner circumference of the plate main body, wherein the third partial plate feature extends about the outer circumference of the plate main body from the outer circumference of the plate main body towards the inner circumference of the plate main body.

7. The media separator plate of claim 6 further comprising:
a fourth partial plate feature formed with the plate main body having a top surface, a bottom surface, an outer circumference edge, an inner circumference edge, a leading edge and a trailing edge, wherein the outer circumference edge is adjacent the outer circumference of the plate main body and the inner circumference edge is spaced apart from the inner circumference of the plate main body, wherein the fourth partial plate feature extends about the outer circumference of the plate main body from the leading edge to the trailing edge of the fourth partial plate feature and from the outer circumference of the plate main body towards the inner circumference of the plate main body; and
a fifth partial plate feature formed with the plate main body having a top surface, a bottom surface, an outer circumference edge and an inner circumference edge, wherein the outer circumference edge is adjacent the outer circumference of the plate main body and the inner circumference edge is spaced apart from the inner circumference of the plate main body, wherein the fifth partial plate feature extends about the outer circumference of the plate main body from the outer circumference of the plate main body towards the inner circumference of the plate main body.

8. The media separator plate of claim 7, wherein the leading edge of the fourth partial plate feature is spaced apart from the inner circumference edge of the third partial plate feature to define an inlet airflow channel having a top surface and a bottom surface that supplies airflow to a recirculation filter and wherein the trailing edge of the fourth partial plate feature is spaced apart from the inner circumference edge of the fifth partial plate feature to define an outlet airflow channel having a top surface and a bottom surface that directs airflow away from the recirculation filter.

9. The media separator plate of claim 8, wherein between the top surface and the bottom surface of the third partial plate feature comprises a third partial plate feature thickness, between the top surface and the bottom surface of the fourth partial plate feature comprises a fourth partial plate feature thickness and between the top surface and the bottom surface of the fifth partial plate feature comprises a fifth partial plate feature thickness, wherein the third partial plate feature thickness, the fourth partial plate feature thickness and the fifth partial plate feature thickness are greater than an inlet channel thickness between the top surface and the bottom surface of the inlet channel and an outlet channel thickness between the top surface and the bottom surface of the outlet channel.

10. The media separator plate of claim 8, wherein the top surfaces of the third partial plate feature, the fourth partial plate feature and the fifth partial plate feature extend above the top surfaces of the inlet channel and the outlet channel and wherein the bottom surfaces of the third partial plate feature, fourth partial plate feature and the fifth partial plate feature extend below the bottom surface of the inlet channel and the outlet channel.

11. A media separator plate comprising:
a plate main body having a continuous, non-interrupted inner circumference and a continuous, non-interrupted outer circumference, wherein the plate main body extends from the inner circumference to the outer circumference;
an upstream air dam feature formed with the plate main body and extending from the inner circumference to the outer circumference, the upstream air dam feature having a top surface, a bottom surface, a leading edge and a trailing edge;

a downstream air dam feature formed with the plate main body and extending from the inner circumference to the outer circumference, the downstream air dam feature having a top surface, a bottom surface, a leading edge and a trailing edge, the leading edge of the upstream air dam feature being radially spaced apart from the trailing edge of the downstream air dam feature and the trailing edge of the upstream air dam feature being radially spaced from the leading edge of the downstream air dam feature to define an arm sweep section;

wherein between the top surface and the bottom surface of the upstream air dam feature comprises an upstream air dam thickness and between the top surface and the bottom surface of the downstream air dam feature comprises a downstream air dam thickness, the upstream air dam and downstream air dam thicknesses being greater than an arm sweep thickness of the arm sweep section; and a third feature coupled to the trailing edge of the downstream air dam feature and having a top surface, a bottom surface, an outer circumference edge and an inner circumference edge, wherein the outer circumference edge is adjacent the outer circumference of the plate main body and the inner circumference edge is spaced apart from the inner circumference of the plate main body, wherein the third feature extends about the outer circumference of the plate main body from the outer circumference of the plate main body towards the inner circumference of the plate main body.

12. The media separator plate of claim 11, wherein the top surface of the upstream air dam feature and the top surface of the downstream air dam feature extend above the top surface of the arm sweeps section and the bottom surface of the upstream air dam feature and the bottom surface of the downstream air dam feature extend below the bottom surface of the arm sweep section.

13. The media separator plate of claim 11, wherein the top surface of the third feature extends above the arm sweep section and the bottom surface of the third feature extends below the bottom surface of the arm sweep section.

14. The media separator plate of claim 11, wherein the plate main body further comprises:

a fourth feature having an outer circumference edge, an inner circumference edge, a leading edge and a trailing edge, wherein the outer circumference edge is adjacent the outer circumference of the plate main body and the inner circumference edge is spaced apart from the inner circumference of the plate main body, wherein the fourth feature extends about the outer circumference of the plate main body from the leading edge to the trailing edge of the fourth feature and from the outer circumference of the plate main body towards the inner circumference of the plate main body; and a fifth feature having an outer circumference edge and an inner circumference edge, wherein the outer circumference edge is adjacent the outer circumference of the plate main body and the inner circumference edge is spaced apart from the inner circumference of the plate main body, wherein the fifth feature extends about the outer circumference of the plate main body from the outer circumference of the plate main body towards the inner circumference of the plate main body.

15. The media separator plate of claim 14, wherein the leading edge of the fourth feature is spaced apart from the inner circumference edge of the third feature to define an inlet airflow channel that supplies airflow to a recirculation filter and wherein the trailing edge of the fourth feature is spaced apart from the inner circumference edge of the fifth feature to define an outlet airflow channel that directs airflow away from the recirculation filter.

* * * * *